June 2, 1970      E. H. WARNE      3,514,946
FUEL SYSTEMS FOR GAS TURBINE ENGINES
Filed Feb. 6, 1968      2 Sheets-Sheet 1

INVENTOR
EUGENE H. WARNE
ATTORNEYS

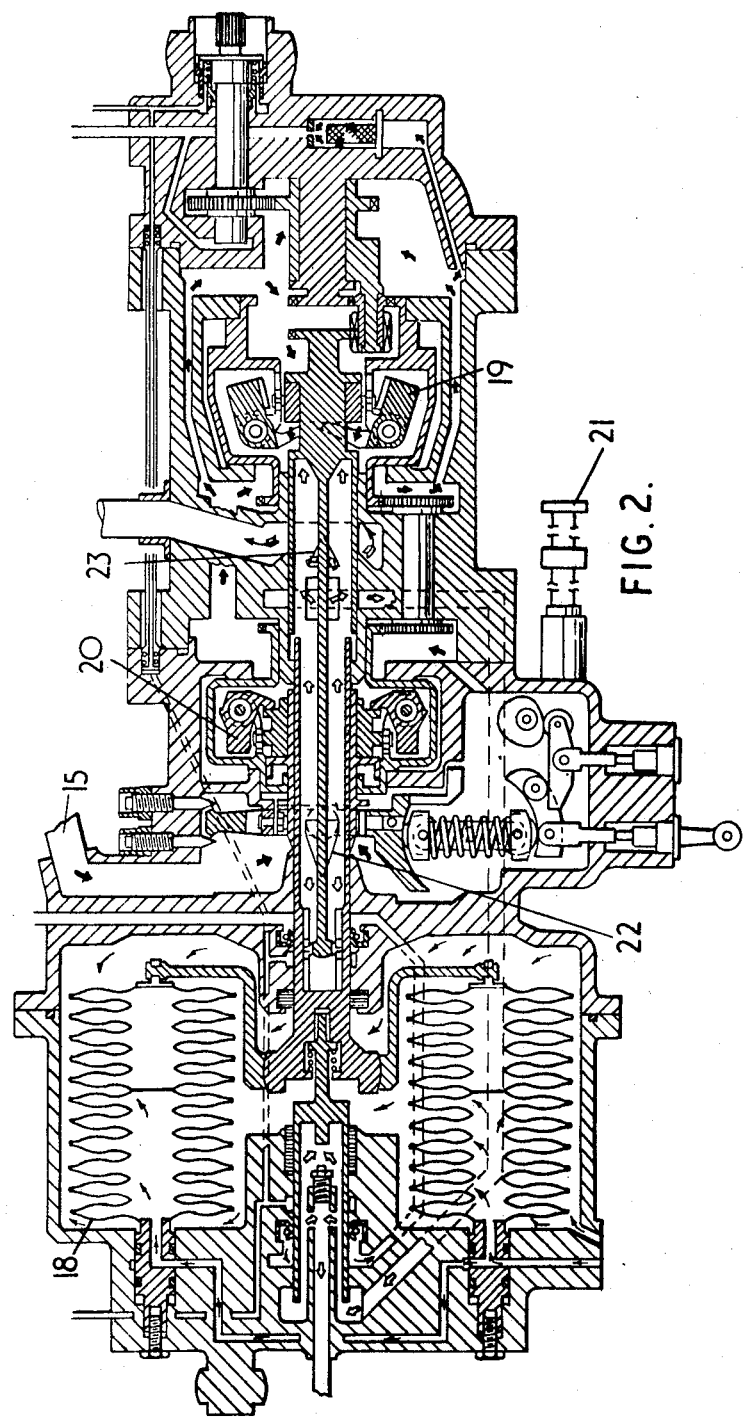

United States Patent Office 3,514,946
Patented June 2, 1970

3,514,946
FUEL SYSTEMS FOR GAS TURBINE ENGINES
Eugene Harold Warne, Solihull, England, assignor to Joseph Lucas (Industries) Limited, Birmingham, England
Filed Feb. 6, 1968, Ser. No. 703,429
Int. Cl. F02c 9/06, 9/08, 9/10
U.S. Cl. 60—39.28                          7 Claims

ABSTRACT OF THE DISCLOSURE

A fuel system for a gas turbine engine comprising a pump, a main passage and a further restricted passage for fuel to the engine, control apparatus in the further passage for varying the flow therethrough, a device communicating with both the main and the further passages, said device being responsive to the pressure at the downstream side of the apparatus, and being arranged to maintain equality of pressure in the two passages.

---

This invention relates to fuel systems for gas turbine engines of the kind comprising a pump for supplying fuel to the engine, and control means responsive to changes in various parameters for varying the flow of fuel from the pump to the engine.

The object of the invention is to provide a fuel system of the kind specified in a convenient form.

In accordance with the present invention, a fuel system for a gas turbine engine comprises a pump for supplying fuel to the engine, means defining a main passage for flow of fuel from the pump to the engine, means defining a further relatively restricted passage for the flow of fuel from the pump to the engine, control apparatus in association with the further passage to vary the flow therethrough, and thus the pressure at the downstream side thereof, and a pressure responsive device with which both passages communicate, at a position in the further passage downstream of the control means, said device being arranged to maintain equality of pressure in the two passages.

Figure 1:
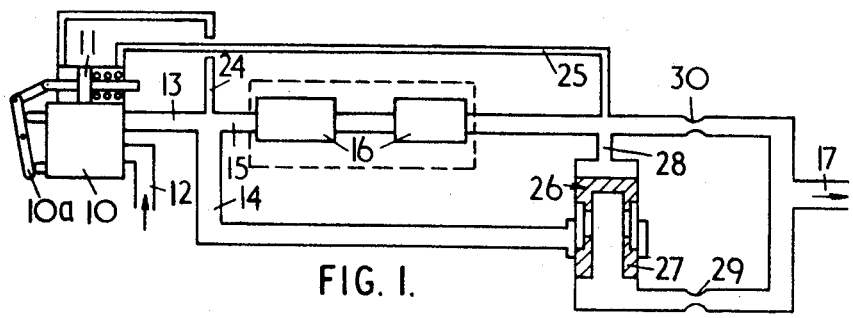
Figure 3:
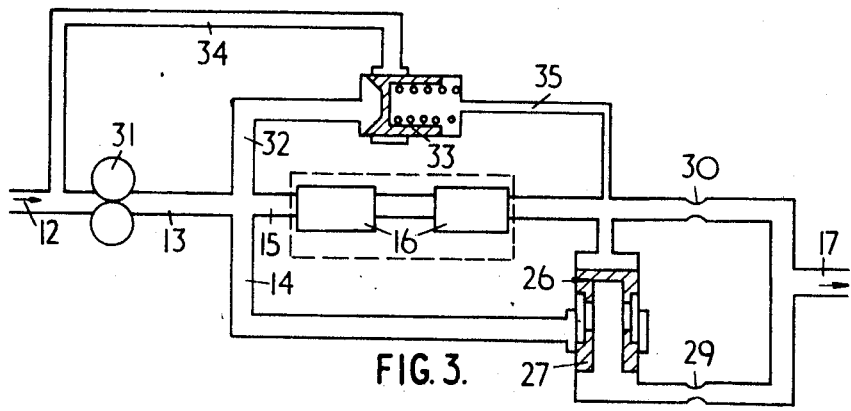
Figure 4:
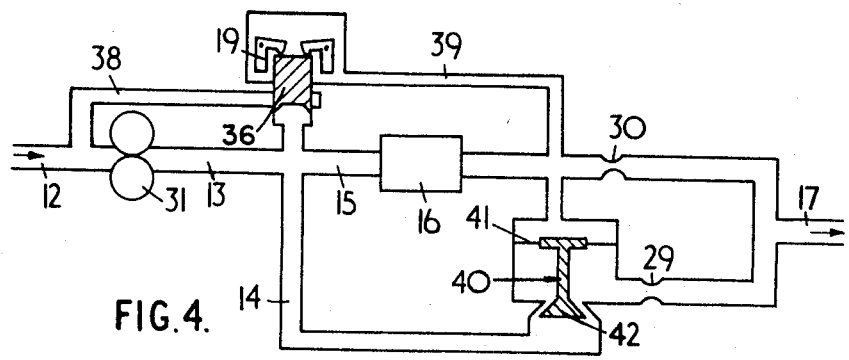

The invention will now be described by way of example with reference to the accompanying drawings in which:

FIG. 1 illustrates diagrammmatically a system constructed in accordance with the invention, FIG. 2 is a cross-sectional view of control for use in the system, and FIGS. 3 and 4 show alternative systems.

With reference to FIGS. 1 and 2, there is provided a fuel system for a gas turbine engine, and having a variable capacity swash plate type pump 10 with an associated pressure responsive servo system 11, having an inlet 12 from a reservoir (not shown) and having an outlet 13 communicating with two passages 14, 15 formed in suitable apparatus (not illustrated), these two passages 14, 15 communicating with an outlet passage 17 from the system which is connected in use to a burner manifold in the engine (not illustrated).

Disposed in the passage 15 forming a restriction therein, is a known kind of flow control apparatus indicated at 16, and shown in FIG. 2, for varying the flow of fuel in accordance with various parameters related to conditions obtaining within the engine. These parameters include pressure conditions at the compressor stage of the engine, measured by a capsule assembly 18, engine speed derived from a pair of sets of weights 19, 20 and temperature of the jet pipe of the engine measured by the device 21.

These parameters are all applied to an axially movable sleeve assembly having a set of triangular orifices 22 through which fuel enters the apparatus and a set of further triangular orifices 23 through which the fuel leaves the apparatus. The apparatus is a combined acceleration control and metering device though shown diagrammatically as being two separate units in FIG. 1.

Upstream and downstream of the apparatus 16 respectively are connected passages 24, 25 communicating at opposite ends respectively of the servo device 11 of the pump 10, the arrangement being such that the pressure drop across the apparatus 16, determines the angularity of the swash plate 10a of the pump 10, and thus the quantity of fuel delivered thereby.

Disposed between the two passages 14, 15 and at a position downstream of the apparatus 16, in the passage 15, is a pressure responsive device 26 which comprises, within a body (not shown), a slidable piston 27, one side of which is subjected to the pressure obtaining in the passage 15 downstream of the apparatus 16 through a passage 28, whilst the other side is subjected directly to the pressure obtaining in the passage 14. This arrangement provides equality of pressure in the passages 14 and 15 by serving as a throttle in the passage 14 for controlling the rate of flow therethrough in accordance with the pressure obtaining in the passage 15.

The proportion of the fuel delivered to the engine flowing through the passage 14 is in a constant ratio to the flow through the passage 15. There are provided restrictors 29, 30 in the passages 14, 15 respectively, which determine this ratio. However, in this example a greater flow is required through the passage 14 than that through the passage 15.

In FIG. 3 there is shown a substantially similar system in which however the swash plate type variable capacity pump 10 is replaced by a fixed displacement pump 31, which in this example is a gear type pump. Excess fuel which is delivered by the pump 31 and which cannot flow along either of the passages 14, 15 to the engine, escapes through a passage 32 past a spill valve 33, into a passage 34 which communicates with the inlet passage 12 of the pump 31. The pressure at the downstream side of the apparatus 16 is permitted to act upon the opposite side of the spill valve 33 through a passage 35.

With reference to FIG. 4, there is shown a system having a fixed displacement gear type pump 31 similar to that illustrated in FIG. 3, but only the fuel metering portion of the fuel control apparatus 16 is disposed in the passage 15. The outlet triangular orifices 23 are however replaced by a spill valve 36 which is acted upon by the weight 19. This valve 36 controls the rate of spill of fuel through passages 37, 38 to the inlet 12 of the pump 31. There is also a passage 39 whereby fuel at the pressure at the downstream side of the portion of the control apparatus 16 in the passage 15 can enter the spill valve 36 so as to act upon it in the same direction as the action of the weights 19. The spill valve 36 is therefore controlled in accordance with the pressure drop across the apparatus 16 as well as by engine speed.

In the example illustrated in FIG. 4 moreover, the pressure responsive device 26 of FIGS. 1 and 3 is replaced by a device 40 having a diaphragm 41 carrying a valve member 42 controlling the flow through the passage 14 in accordance with the pressures obtaining at opposite sides of the diaphragm 41. The diaphragm is subjected to the pressures in the passages 14, 15 respectively.

With the arrangements illustrated, a greater proportion of the total fuel flow to the engine takes place through the passage 14, but in order to permit the use of a reasonably small control apparatus, a proportion of the total flow occurs through the passage 15 in which the control apparatus is provided. There is also in each case, a pressure responsive device in the form of the valve 26 or 40 for ensuring that the rate of flow in the passage 14 is always a fixed proportion of that in the passage 15.

Having thus described my invention what I claim as new and desire to secure by Letters Patent is:

1. A fuel system for a gas turbine engine comprising a pump for supplying fuel to the engine, means defining a main passage for flow of fuel from the pump to the engine, means defining a further passage for the flow of fuel from the pump to the engine, said further passage being restricted by comparison with said main passage, control apparatus disposed in the further passage to vary the flow therethrough, and thus the pressure at the downstream side thereof, means for controlling said control apparatus in accordance with engine operating conditions, and a pressure responsive device which at one side thereof communicates with the main passage, and at the other side thereof communicates with said further passage at a position downstream of the control apparatus, said pressure responsive device being arranged to maintain equality of pressure in the main and further passages.

2. A fuel system as claimed in claim 1 in which passages are provided whereby the pressure drop created by the control apparatus is applied to means for varying the output of the pump into the system.

3. A fuel system as claimed in claim 2 in which the pump is a swash plate type pump having an associated servo device for varying its output, the passages being connected so that the pressure drop across the control apparatus is applied to opposite sides of the servo device.

4. A fuel system as claimed in claim 2 in which the pump is a gear pump and the means for varying the output is a spill valve to which the passages are connected so that the pressure drop across the control apparatus is applied to it.

5. A fuel system as claimed in claim 4 in which spill valve is provided with a set of weights whereby the opening of this valve is also responsive to the speed of the associated engine.

6. A fuel system as claimed in claim 1 in which the pressure responsive device is a piston type throttle valve in the main passage and its position is controlled in accordance with pressures at opposite sides thereof obtained from the main and further passages respectively.

7. A fuel system as claimed in claim 1 in which the pressure responsive device is a diaphragm controlled throttle in the main passage, its position being controlled in accordance with pressure applied to opposite sides of the diaphragm and obtained from the main and further passages respectively.

References Cited

UNITED STATES PATENTS

| | | |
|---|---|---|
| 2,747,369 | 5/1956 | Lawrence. |
| 2,950,597 | 8/1960 | Clarke. |
| 3,427,804 | 2/1969 | Lawrence _____ 60—39.28 |

AL LAWRENCE SMITH, Primary Examiner

U.S. Cl. X.R.

103—38